United States Patent
Li et al.

(10) Patent No.: US 12,024,643 B2
(45) Date of Patent: Jul. 2, 2024

(54) SUPER-HYDROPHOBIC ANTI-POLLUTION FLASHOVER COATING WITH HYDROPHOBICITY MIGRATION, AND PREPARATION METHOD THEREOF

(71) Applicants: State Grid Shandong Electric Power Research Institute, Shandong (CN); State Grid Corporation of China, Beijing (CN)

(72) Inventors: Wenjing Li, Shandong (CN); Xiaoming Wang, Shandong (CN); Xingeng Li, Shandong (CN); Bo Jiang, Shandong (CN); Shuo Yao, Shandong (CN); Gengzeng Zhu, Shandong (CN); Yaping Wu, Shandong (CN); Lijun Zong, Shandong (CN); Shuang Tian, Shandong (CN); Fengjie Yan, Shandong (CN); Zhibin Fan, Shandong (CN); Zhenyue Zhang, Shandong (CN); Die Wang, Shandong (CN); Zhiyue Gao, Shandong (CN); Chunxu Mi, Shandong (CN); Qian Wang, Shandong (CN)

(73) Assignees: State Grid Shandong Electric Power Research Institute, Jinan (CN); State Grid Corporation of China, Beijing (CN)

(*) Notice: Subject to any disclaimer, the term of this patent is extended or adjusted under 35 U.S.C. 154(b) by 529 days.

(21) Appl. No.: 17/601,708

(22) PCT Filed: Aug. 6, 2021

(86) PCT No.: PCT/CN2021/111354
§ 371 (c)(1),
(2) Date: Oct. 5, 2021

(87) PCT Pub. No.: WO2021/249577
PCT Pub. Date: Dec. 16, 2021

(65) Prior Publication Data
US 2022/0306896 A1 Sep. 29, 2022

(30) Foreign Application Priority Data

Jun. 8, 2020 (CN) .......................... 202010512339.5

(51) Int. Cl.
| | | |
|---|---|---|
| C09D 183/04 | (2006.01) | |
| C09D 5/16 | (2006.01) | |
| C09D 5/18 | (2006.01) | |
| C09D 7/61 | (2018.01) | |

(52) U.S. Cl.
CPC ......... C09D 183/04 (2013.01); C09D 5/1687 (2013.01); C09D 5/18 (2013.01); C09D 7/61 (2018.01)

(58) Field of Classification Search
CPC .......... C08K 3/22; C08K 3/36; C08K 5/5465; C08K 2003/2227; C09D 183/04; C09D 5/1687; C09D 5/18; C09D 7/61; C09D 7/48; C09D 5/1675
See application file for complete search history.

(56) References Cited

FOREIGN PATENT DOCUMENTS

| CN | 109096914 A | 12/2018 |
|---|---|---|
| CN | 110776826 A | 2/2020 |

OTHER PUBLICATIONS

English Translation of PCT Written Opinion (PCT/CN2021/111354) (Year: 2020).*

* cited by examiner

*Primary Examiner* — Anthony J Green

(57) ABSTRACT

The present invention provides a super-hydrophobic anti-pollution flashover coating with hydrophobicity transference, which is prepared from the following raw materials: a silicone resin, an organic solvent, silicon oxide, a flame retardant, a cross-linking agent, a coupling agent, a dispersing agent, a defoaming agent, a leveling agent, and a silicone resin curing agent. The present invention also provides a preparation method of the super-hydrophobic anti-pollution flashover coating with hydrophobicity transference. The anti-pollution flashover coating provided by the present invention has both super-hydrophobicity and hydrophobicity transference, which improves the hydrophobicity of a surface of an anti-pollution flashover coating layer, ensures the long-term effectiveness of an anti-pollution flashover coating layer, and prolongs a service life of an anti-pollution flashover coating layer, thereby solving the problem that existing anti-pollution flashover coatings have low hydrophobicity and are prone to contaminant accumulation on the surface and reducing the occurrence probability of pollution flashover accidents.

12 Claims, No Drawings

SUPER-HYDROPHOBIC ANTI-POLLUTION FLASHOVER COATING WITH HYDROPHOBICITY MIGRATION, AND PREPARATION METHOD THEREOF

TECHNICAL FIELD

The present invention relates to the technical field of super-hydrophobic anti-pollution flashover coatings, and in particular to a super-hydrophobic anti-pollution flashover coating with hydrophobicity transference, and a preparation method thereof.

BACKGROUND

A super-hydrophobic surface refers to a surface with a contact angle greater than 150° and a sliding angle less than 10°. In recent years, the super-hydrophobic surface has attracted widespread attention due to its unique super-hydrophobic and self-cleaning properties, and shows promising application prospects in both production and life.

With the increasingly-heavy pollution to the atmospheric environment, pollution flashover accidents on transmission lines occur frequently, which seriously threatens the safe and stable operation of the power grid. A pollution flashover accident occurs mainly through the following processes: accumulation of contaminants on a surface of external insulation equipment; wetting of the surface of the external insulation equipment; generation of dry and wet zones due to discharge of an external insulation surface; and generation of electrical arcs and development into flashover. Therefore, reducing the accumulation of contaminants on a surface of external insulation equipment and improving the hydrophobicity of a surface of external insulation equipment are very beneficial for improving an insulation strength of the external insulation equipment and reducing an occurrence probability of pollution flashover accidents.

RTV anti-pollution flashover coatings are one of the main products to prevent large-scale pollution flashover accidents in the power grid. The hydrophobicity transference of an RTV anti-pollution flashover coating is a key factor to ensure its long-term anti-pollution flashover ability. However, the initial contact angle of an RTV anti-pollution flashover coating was only 110° to 120°, and with the progress of service time, the hydrophobicity will continuously decrease, resulting in a decrease in its anti-pollution flashover ability.

Therefore, developing a super-hydrophobic anti-pollution flashover coating with hydrophobicity transference, improving the hydrophobicity of a surface of an anti-pollution flashover coating layer, and ensuring the long-term hydrophobicity of an anti-pollution flashover coating layer is of great significance for improving the anti-pollution flashover ability of external insulation equipment and reducing the occurrence probability of pollution flashover accidents and is also a technical problem urgently to be solved by those skilled in the art.

SUMMARY OF THE INVENTION

One objective of the present invention is to provide a super-hydrophobic anti-pollution flashover coating with hydrophobicity transference. Another objective of the present invention is to provide a preparation method of the super-hydrophobic anti-pollution flashover coating with hydrophobicity transference.

In order to solve the above technical problem, the present invention provides the following technical solutions.

A super-hydrophobic anti-pollution flashover coating with hydrophobicity transference is provided, which is prepared by mixing a component A and a component B. A mass ratio of the component A to the component B is (90-110):1;

the component A is made of the following raw materials in parts by mass: 8 to 12 parts of a silicone resin, 70 to 80 parts of an organic solvent, 1 to 5 parts of silicon oxide, 5 to 10 parts of a flame retardant, 1 to 3 parts of a cross-linking agent, 1 to 5 parts of a coupling agent, 0.5 to 1.5 parts of a dispersing agent, 0.1 to 1 part of a defoaming agent, and 0.1 to 2 parts of a leveling agent; and the component B is a silicone resin curing agent.

Preferably, the silicone resin may be a polyorganosiloxane (POS) resin.

Preferably, the organic solvent may be one or more selected from the group consisting of xylene, toluene, ethyl acetate, and butyl acetate.

Preferably, the flame retardant may be one or more selected from the group consisting of aluminum hydroxide, magnesium hydroxide, attapulgite, an organic nitrogen-phosphorous based flame retardant, decabromodiphenyl ether, and diantimony trioxide.

Preferably, the cross-linking agent may be a ketoxime cross-linking agent, and the ketoxime cross-linking agent may be one or two selected from the group consisting of methyltris(methylethylketoximino)silane and methyltris(dimethylketoxime)silane.

Preferably, the coupling agent may be a silane coupling agent (SCA).

A preparation method of the super-hydrophobic anti-pollution flashover coating with hydrophobicity transference described above is also provided, comprising the following steps:

1) preparation of an organic solvent A and an organic solvent B: weighing an organic solvent according to a formula, thoroughly stirring, and dividing a resulting solvent into two parts: an organic solvent A and an organic solvent B;
2) preparation of a particle dispersion: adding the silicon oxide and the flame retardant to the organic solvent A prepared in step 1) according to the formula, and subjecting a resulting mixture to dispersion by ultrasonic treatment, shearing, or stirring;
3) preparation of a film-forming material dispersion: adding the silicone resin to the organic solvent B prepared in step 1) according to the formula, and subjecting a resulting mixture to dispersion through shearing or stirring;
4) adding the particle dispersion prepared in step 2) to the film-forming material dispersion prepared in step 3), adding the cross-linking agent, the coupling agent, the dispersing agent, the defoaming agent, and the leveling agent, and thoroughly stirring a resulting mixture to obtain the component A; and
5) mixing the component A prepared in step 4) and the component B according to the formula and stirring thoroughly to obtain the super-hydrophobic anti-pollution flashover coating with hydrophobicity transference.

The present invention achieves the following beneficial technical effects:

(1) The anti-pollution flashover coating provided by the present invention has both super-hydrophobicity and hydrophobicity transference, which improves the hydrophobicity of a surface of an anti-pollution flashover coating layer, ensures the long-term effectiveness of an anti-pollution flashover coating layer, and prolongs a service life of an anti-pollution flashover coating layer, thereby solving the problem that existing anti-pollution flashover coatings have low hydrophobicity and are prone to contaminant accumulation on the surface and reducing the occurrence probability of pollution flashover accidents.

(2) The preparation process of the anti-pollution flashover coating provided by the present invention is simple, which can realize both the super-hydrophobicity and the hydrophobicity transference of an anti-pollution flashover coating layer through one-step spraying. A surface of an anti-pollution flashover coating layer contaminated by diatomaceous earth can restore its super-hydrophobic effect after sufficient hydrophobicity transference, thereby realizing the super-hydrophobicity of a contaminated surface.

(3) The present invention can realize the super-hydrophobic effect of an anti-pollution flashover coating layer and improve the hydrophobicity and anti-wetting ability of an anti-pollution flashover coating layer, thereby improving the external insulation strength of an anti-pollution flashover coating layer. The present invention can achieve the hydrophobicity transference of an anti-pollution flashover coating layer, ensure the long-term effectiveness of the super-hydrophobicity of an anti-pollution flashover coating layer, prolong a service life of an anti-pollution flashover coating layer, and reduce the occurrence probability of pollution flashover accidents.

DETAILED DESCRIPTION OF ILLUSTRATED EXAMPLES

In order to further understand the present invention, preferred examples of the present invention will be described below with reference to examples. However, it should be understood that these descriptions are merely for further illustrating the features and advantages of the present invention, rather than limiting the claims of the present invention.

The present invention provides a super-hydrophobic anti-pollution flashover coating with hydrophobicity transference, which is prepared by mixing a component A and a component B. A mass ratio of the component A to the component B is (90-110):1;

the component A is made of the following raw materials in parts by mass: 8 to 12 parts of a silicone resin, 70 to 80 parts of an organic solvent, 1 to 5 parts of silicon oxide, 5 to 10 parts of a flame retardant, 1 to 3 parts of a cross-linking agent, 1 to 5 parts of a coupling agent, 0.5 to 1.5 parts of a dispersing agent, 0.1 to 1 part of a defoaming agent, and 0.1 to 2 parts of a leveling agent; and the component B is a silicone resin curing agent.

In an example of the present invention, the silicone resin may be a polyorganosiloxane resin.

In an example of the present invention, the organic solvent may be one or more from the group consisting of xylene, toluene, ethyl acetate, and butyl acetate.

In an example of the present invention, the flame retardant may be one or more from the group consisting of aluminum hydroxide, magnesium hydroxide, attapulgite, an organic nitrogen-phosphorous flame retardant, decabromodiphenyl ether, and diantimony trioxide. The organic nitrogen-phosphorous based flame retardant refers to an organic nitrogen flame retardant, an organic phosphorus flame retardant, or an organic nitrogen-phosphorous composite flame retardant.

In an example of the present invention, the cross-linking agent may be a ketoxime cross-linking agent, and the ketoxime cross-linking agent may be one or two from the group consisting of methyltris(methylethylketoximino)silane and methyltris(dimethylketoxime)silane.

In an example of the present invention, the coupling agent may be an SCA.

The present invention also provides a preparation method of the super-hydrophobic anti-pollution flashover coating with hydrophobicity transference described above, including the following steps:

1) preparation of organic solvents: weighing an organic solvent according to a formula, thoroughly stirring, and dividing a resulting organic solvent into two parts: an organic solvent A and an organic solvent B;
2) preparation of a particle dispersion: adding the silicon oxide and the flame retardant to the organic solvent A prepared in step 1) according to the formula, and subjecting a resulting mixture to dispersion through ultrasonic treatment, shearing, or stirring;
3) preparation of a film-forming material dispersion: adding the silicone resin to the organic solvent B prepared in step 1) according to the formula, and subjecting a resulting mixture to dispersion through shearing or stirring;
4) adding the particle dispersion prepared in step 2) to the film-forming material dispersion prepared in step 3), adding the cross-linking agent, the coupling agent, the dispersing agent, the defoaming agent, and the leveling agent, and thoroughly stirring a resulting mixture to obtain the component A; and
5) thoroughly mixing and stirring the component A prepared in step 4) and the component B according to the formula to obtain the super-hydrophobic anti-pollution flashover coating with hydrophobicity transference.

In the present invention, the dispersing agent is specifically a BYK-163 series wetting and dispersing additive, which can improve the wettability and dispersibility of pigment particles in the anti-pollution flashover coating system.

In the present invention, the defoaming agent is specifically BYK-066N, which can inhibit the generation of bubbles in the anti-pollution flashover coating system and promote the rupture of generated bubbles.

In the present invention, the leveling agent refers to a polyacrylate leveling agent, and the leveling agent is specifically a BYK-355 series leveling agent.

The super-hydrophobicity in the present invention is produced as follows: polyorganosiloxane with low surface energy is used as a film-forming material and silicon oxide and other particles are added to construct a rough micro/nano structure on a surface of an anti-pollution flashover coating layer (the super-hydrophobic surface of the present invention), thereby realizing the super-hydrophobic effect of an anti-pollution flashover coating layer.

The hydrophobicity transference in the present invention is produced as follows: The hydrophobicity transference in the present invention is mainly produced by the polyorganosiloxane. Some small polyorganosiloxane molecules will remain in a curing process thereof and can be transferred to a surface of an anti-pollution flashover coating layer, thereby realizing the hydrophobicity transference of the anti-pollution flashover coating layer.

In order to further understand the present invention, the super-hydrophobic anti-pollution flashover coating with hydrophobicity transference and the preparation method thereof provided by the present invention will be described in detail below with reference to examples. The protection scope of the present invention is not limited by the following examples.

Example 1

A super-hydrophobic anti-pollution flashover coating with hydrophobicity transference was provided, which was prepared by mixing a component A and a component B. A mass ratio of the component A to the component B was 100:1;

the component A was made of the following raw materials in parts by mass: 10 parts of a silicone resin, 78 parts of a mixture of xylene and ethyl acetate (a mass ratio of xylene to ethyl acetate was 1:1), 3 parts of silicon oxide, 6 parts of aluminum hydroxide, 2 parts of methyltris(methylethylketoximino)silane, 3 parts of SCA, 1 part of BYK-163, 0.5 part of BYK-066N, and 1.5 parts of BYK-355; and the component B was a silicone resin curing agent.

A preparation method of the super-hydrophobic anti-pollution flashover coating with hydrophobicity transference in Example 1 was also provided, including the following steps:

1) preparation of organic solvents: an organic solvent was weighed according to the formula, then thoroughly stirred, and divided into two parts: an organic solvent A and an organic solvent B;
2) preparation of a particle dispersion: the silicon oxide and the flame retardant were added to the organic solvent A prepared in step 1) according to the formula, and a resulting mixture was subjected to dispersion through ultrasonic treatment, shearing, or stirring;
3) preparation of a film-forming material dispersion: the silicone resin was added to the organic solvent B prepared in step 1) according to the formula, and a resulting mixture was subjected to dispersion through shearing or stirring;
4) the particle dispersion prepared in step 2) was added to the film-forming material dispersion prepared in step 3), the cross-linking agent, the coupling agent, the dispersing agent, the defoaming agent, and the leveling agent were added, and a resulting mixture was thoroughly stirred and ground to obtain the component A; and
5) the component A prepared in step 4) and the component B were thoroughly mixed and stirred according to the formula to obtain the super-hydrophobic anti-pollution flashover coating with hydrophobicity transference.

Comparative Example 1

In Comparative Example 1, a glass sheet was provided as a comparative sample. The glass sheet was thoroughly cleaned with alcohol and then dried.

Comparative Example 2

An anti-pollution flashover coating layer provided in Comparative Example 2 was an RTV anti-pollution flashover coating layer. An RTV anti-pollution flashover coating could be directly purchased. The RTV anti-pollution flashover coating was sprayed on a glass sheet with an air spray gun and then cured to obtain the RTV anti-pollution flashover coating layer.

Comparative Example 3

An ordinary super-hydrophobic anti-pollution flashover coating layer was provided in Comparative Example 3. An ordinary super-hydrophobic anti-pollution flashover coating could be directly purchased and did not have hydrophobicity transference. According to instructions of the anti-pollution flashover coating, the ordinary super-hydrophobic anti-pollution flashover coating was sprayed on a glass sheet with an air spray gun and then cured to obtain the ordinary super-hydrophobic anti-pollution flashover coating layer.

Hydrophobicity Test Results

A contact angle and a sliding angle of the anti-pollution flashover coating layers in the above example and comparative examples were measured with a contact angle measuring instrument. Specifically, 4 μL of water droplets were used for the measurement of the contact angle, and 10 μL of water droplets were used for the measurement of the sliding angle of the anti-pollution flashover coating layers. The glass sheet in Comparative Example 1 had a contact angle only of 20°; the RTV anti-pollution flashover coating layer in Comparative Example 2 had a contact angle of 118°; and the super-hydrophobic anti-pollution flashover coating layers in Example 1 and Comparative Example 3 had contact angles respectively of 158.2° and 155° and sliding angles respectively of 6.5° and 8.5°, which were significantly better than that of Comparative Examples 1 and 2.

The contamination method was used to characterize the hydrophobicity transference of the anti-pollution flashover coating layers. A specific operation process was as follows: diatomaceous earth and sodium chloride were mixed and prepared into a contamination liquid to contaminate the anti-pollution flashover coating layers in Comparative Examples 1 to 3 and Example 1; and contaminated anti-pollution flashover coating layers were allowed to stand for 4 d at room temperature, and after sufficient transference, a contact angle and a sliding angle were measured with a contact angle measuring instrument for the anti-pollution flashover coating layers, where specifically, 4 μL of water droplets were used for the measurement of the contact angle and 10 μL of water droplets were used for the measurement of the sliding angle of the anti-pollution flashover coating layers. The hydrophobicity of the anti-pollution flashover coating layer in Comparative Example 1 was significantly reduced after contamination; the RTV anti-pollution flashover coating layer in Comparative Example 2 still exhibited high hydrophobicity after contamination due to hydrophobicity transference, with a contact angle of 130°; as the ordinary super-hydrophobic anti-pollution flashover coating layer in Comparative Example 3 has no hydrophobicity transference, the hydrophobicity of the ordinary super-hydrophobic anti-pollution flashover coating layer decreased sharply after contamination, with a contact angle only of 60°; and as the anti-pollution flashover coating layer in Example 1 of the present invention has both superhydrophobicity and hydrophobicity transference, the anti-pollution flashover coating layer still exhibited a super-hydrophobic effect after contamination. It indicates that the super-hydrophobic anti-pollution flashover coating layer with hydrophobicity transference in the present invention can still maintain the super-hydrophobicity of external insulation equipment even if contaminants are accumulated on the surface, and is not easily be wetted, which reduces the occurrence probability of pollution flashover accidents.

TABLE 1

Hydrophobicity measurement results of the anti-pollution flashover coating layers in Example 1 and Comparative Examples 1 to 3

|  | Contact angle/° | Sliding angle/° | Contact angle after transference/° | Sliding angle after transference/° |
| --- | --- | --- | --- | --- |
| Example 1 | 158.2 | 6.5 | 156 | 7.5 |
| Comparative Example 1 | 20 | — | 18 | — |
| Comparative Example 2 | 118 | — | 130 | — |
| Comparative Example 3 | 155 | 8.5 | 60 | — |

"—" in Table 1 means that an index value is greater than 90°.

A flashover voltage on a surface of an anti-pollution flashover coating layer after contamination was used to measure the anti-pollution flashover ability of the anti-pollution flashover coating layer. A specific operation process was as follows: a mixture of diatomaceous earth and sodium chloride was prepared into a contamination liquid to contaminate the anti-pollution flashover coating layers in the example and comparative examples; and after contaminated anti-pollution flashover coating layers were subjected to sufficient transference, the contaminated anti-pollution flashover coating layers were wetted in an artificial environment test box, and then a flashover voltage test was conducted. The glass sheet in Comparative Example 1 was easily wetted due to a small contact angle, with a flashover voltage only of 15.7 kV; the RTV anti-pollution flashover coating layer in Comparative Example 2 had a flashover voltage of 26 kV; the super-hydrophobic anti-pollution flashover coating layer in Comparative Example 3 had a flashover voltage of 18 kV; and the anti-pollution flashover coating layer in Example 1 of the present invention still had a super-hydrophobic effect on the surface due to the transference, was hardly wetted, and had a flashover voltage of 33.4 kV. It indicates that the anti-pollution flashover coating layer in Example 1 has both super-hydrophobicity and hydrophobicity transference, which improves the hydrophobicity of an anti-pollution flashover coating surface, ensures the long-term effectiveness of the anti-pollution flashover coating layer, extends a service life of the anti-pollution flashover coating layer, and reduces the occurrence probability of pollution flashover accidents.

The above description of examples is merely provided to help illustrate the method of the present invention and a core idea thereof. It should be noted that several improvements and modifications may be made by persons of ordinary skill in the art without departing from the principle of the present invention, and these improvements and modifications should also fall within the protection scope of the present invention.

The invention claimed is:

1. A super-hydrophobic anti-pollution flashover coating with hydrophobicity transference, wherein the super-hydrophobic anti-pollution flashover coating is prepared by mixing a component A and a component B, and a mass ratio of the component A to the component B is (90-110):1;
   wherein the component A is made of the following raw materials in parts by mass: 8 to 12 parts of a silicone resin, 70 to 80 parts of an organic solvent, 1 to 5 parts of silicon oxide, 5 to 10 parts of a flame retardant, 1 to 3 parts of a cross-linking agent, 1 to 5 parts of a coupling agent, 0.5 to 1.5 parts of a dispersing agent, 0.1 to 1 part of a defoaming agent, and 0.1 to 2 parts of a leveling agent; and
   the component B is a silicone resin curing agent.

2. The super-hydrophobic anti-pollution flashover coating with hydrophobicity transference according to claim 1, wherein the silicone resin is a polyorganosiloxane resin.

3. The super-hydrophobic anti-pollution flashover coating with hydrophobicity transference according to claim 1, wherein the organic solvent is one or more selected from the group consisting of xylene, toluene, ethyl acetate, and butyl acetate.

4. The super-hydrophobic anti-pollution flashover coating with hydrophobicity transference according to claim 1, wherein the flame retardant is one or more selected from the group consisting of aluminum hydroxide, magnesium hydroxide, attapulgite, an organic nitrogen-phosphorous based flame retardant, decabromodiphenyl ether, and diantimony trioxide.

5. The super-hydrophobic anti-pollution flashover coating with hydrophobicity transference according to claim 1, wherein the cross-linking agent is a ketoxime cross-linking agent, and the ketoxime cross-linking agent is one or two selected from the group consisting of methyltris(methylethylketoximino)silane and methyltris(dimethylketoxime)silane.

6. The super-hydrophobic anti-pollution flashover coating with hydrophobicity transference according to claim 1, wherein the coupling agent is a silane coupling agent.

7. A preparation method of the super-hydrophobic anti-pollution flashover coating with hydrophobicity transference according to claim 1, comprising the following steps:
   1) preparation of an organic solvent A and an organic solvent B: weighing the organic solvent according to a formula, thoroughly stirring, and dividing a resulting solvent into two parts: an organic solvent A and an organic solvent B;
   2) preparation of a particle dispersion: adding the silicon oxide and the flame retardant to the organic solvent A prepared in step 1) according to the formula, and subjecting a resulting mixture to dispersion by ultrasonic treatment, shearing, or stirring;
   3) preparation of a film-forming material dispersion: adding the silicone resin to the organic solvent B prepared in step 1) according to the formula, and subjecting a resulting mixture to dispersion through shearing or stirring;
   4) adding the particle dispersion prepared in step 2) to the film-forming material dispersion prepared in step 3), adding the cross-linking agent, the coupling agent, the dispersing agent, the defoaming agent, and the leveling agent, and thoroughly stirring a resulting mixture to obtain the component A; and
   5) mixing the component A prepared in step 4) and the component B according to the formula and thoroughly stirring to obtain the super-hydrophobic anti-pollution flashover coating with hydrophobicity transference.

8. A preparation method of the super-hydrophobic anti-pollution flashover coating with hydrophobicity transference according to claim 2, comprising the following steps:
   1) preparation of an organic solvent A and an organic solvent B: weighing the organic solvent according to a formula, thoroughly stirring, and dividing a resulting solvent into two parts: an organic solvent A and an organic solvent B;
   2) preparation of a particle dispersion: adding the silicon oxide and the flame retardant to the organic solvent A prepared in step 1) according to the formula, and subjecting a resulting mixture to dispersion by ultrasonic treatment, shearing, or stirring;

3) preparation of a film-forming material dispersion: adding the silicone resin to the organic solvent B prepared in step 1) according to the formula, and subjecting a resulting mixture to dispersion through shearing or stirring;
4) adding the particle dispersion prepared in step 2) to the film-forming material dispersion prepared in step 3), adding the cross-linking agent, the coupling agent, the dispersing agent, the defoaming agent, and the leveling agent, and thoroughly stirring a resulting mixture to obtain the component A; and
5) mixing the component A prepared in step 4) and the component B according to the formula and thoroughly stirring to obtain the super-hydrophobic anti-pollution flashover coating with hydrophobicity transference.

9. A preparation method of the super-hydrophobic anti-pollution flashover coating with hydrophobicity transference according to claim 3, comprising the following steps:
1) preparation of an organic solvent A and an organic solvent B: weighing the organic solvent according to a formula, thoroughly stirring, and dividing a resulting solvent into two parts: an organic solvent A and an organic solvent B;
2) preparation of a particle dispersion: adding the silicon oxide and the flame retardant to the organic solvent A prepared in step 1) according to the formula, and subjecting a resulting mixture to dispersion by ultrasonic treatment, shearing, or stirring;
3) preparation of a film-forming material dispersion: adding the silicone resin to the organic solvent B prepared in step 1) according to the formula, and subjecting a resulting mixture to dispersion through shearing or stirring;
4) adding the particle dispersion prepared in step 2) to the film-forming material dispersion prepared in step 3), adding the cross-linking agent, the coupling agent, the dispersing agent, the defoaming agent, and the leveling agent, and thoroughly stirring a resulting mixture to obtain the component A; and
5) mixing the component A prepared in step 4) and the component B according to the formula and thoroughly stirring to obtain the super-hydrophobic anti-pollution flashover coating with hydrophobicity transference.

10. A preparation method of the super-hydrophobic anti-pollution flashover coating with hydrophobicity transference according to claim 4, comprising the following steps:
1) preparation of an organic solvent A and an organic solvent B: weighing the organic solvent according to a formula, thoroughly stirring, and dividing a resulting solvent into two parts: an organic solvent A and an organic solvent B;
2) preparation of a particle dispersion: adding the silicon oxide and the flame retardant to the organic solvent A prepared in step 1) according to the formula, and subjecting a resulting mixture to dispersion by ultrasonic treatment, shearing, or stirring;
3) preparation of a film-forming material dispersion: adding the silicone resin to the organic solvent B prepared in step 1) according to the formula, and subjecting a resulting mixture to dispersion through shearing or stirring;
4) adding the particle dispersion prepared in step 2) to the film-forming material dispersion prepared in step 3), adding the cross-linking agent, the coupling agent, the dispersing agent, the defoaming agent, and the leveling agent, and thoroughly stirring a resulting mixture to obtain the component A; and
5) mixing the component A prepared in step 4) and the component B according to the formula and thoroughly stirring to obtain the super-hydrophobic anti-pollution flashover coating with hydrophobicity transference.

11. A preparation method of the super-hydrophobic anti-pollution flashover coating with hydrophobicity transference according to claim 5, comprising the following steps:
1) preparation of an organic solvent A and an organic solvent B: weighing the organic solvent according to a formula, thoroughly stirring, and dividing a resulting solvent into two parts: an organic solvent A and an organic solvent B;
2) preparation of a particle dispersion: adding the silicon oxide and the flame retardant to the organic solvent A prepared in step 1) according to the formula, and subjecting a resulting mixture to dispersion by ultrasonic treatment, shearing, or stirring;
3) preparation of a film-forming material dispersion: adding the silicone resin to the organic solvent B prepared in step 1) according to the formula, and subjecting a resulting mixture to dispersion through shearing or stirring;
4) adding the particle dispersion prepared in step 2) to the film-forming material dispersion prepared in step 3), adding the cross-linking agent, the coupling agent, the dispersing agent, the defoaming agent, and the leveling agent, and thoroughly stirring a resulting mixture to obtain the component A; and
5) mixing the component A prepared in step 4) and the component B according to the formula and thoroughly stirring to obtain the super-hydrophobic anti-pollution flashover coating with hydrophobicity transference.

12. A preparation method of the super-hydrophobic anti-pollution flashover coating with hydrophobicity transference according to claim 6, comprising the following steps:
1) preparation of an organic solvent A and an organic solvent B: weighing the organic solvent according to a formula, thoroughly stirring, and dividing a resulting solvent into two parts: an organic solvent A and an organic solvent B;
2) preparation of a particle dispersion: adding the silicon oxide and the flame retardant to the organic solvent A prepared in step 1) according to the formula, and subjecting a resulting mixture to dispersion by ultrasonic treatment, shearing, or stirring;
3) preparation of a film-forming material dispersion: adding the silicone resin to the organic solvent B prepared in step 1) according to the formula, and subjecting a resulting mixture to dispersion through shearing or stirring;
4) adding the particle dispersion prepared in step 2) to the film-forming material dispersion prepared in step 3), adding the cross-linking agent, the coupling agent, the dispersing agent, the defoaming agent, and the leveling agent, and thoroughly stirring a resulting mixture to obtain the component A; and
5) mixing the component A prepared in step 4) and the component B according to the formula and thoroughly stirring to obtain the super-hydrophobic anti-pollution flashover coating with hydrophobicity transference.

\* \* \* \* \*